United States Patent [19]
Lander et al.

[11] 3,863,118
[45] Jan. 28, 1975

[54] CLOSED-LOOP SPEED CONTROL FOR STEP MOTORS

[75] Inventors: Emil Lander, Rockford; Richard A. Yackel; Gurdial Singh, both of Urbana, all of Ill.

[73] Assignee: Warner Electric Brake and Clutch Company, South Beloit, Ind.

[22] Filed: Jan. 26, 1973

[21] Appl. No.: 327,150

[52] U.S. Cl. .................. 318/685, 318/254, 318/439
[51] Int. Cl. ............................................ G05b 19/40
[58] Field of Search .......... 318/138, 254, 439, 696, 318/685, 415

[56] References Cited
UNITED STATES PATENTS

| | | | |
|---|---|---|---|
| 3,374,410 | 3/1968 | Conquest et al. | 318/635 |
| 3,414,786 | 12/1968 | Kasmer et al. | 318/685 X |
| 3,443,181 | 5/1969 | Kozol et al. | 318/685 |
| 3,463,985 | 8/1969 | Fredriksen | 318/685 |
| 3,518,516 | 6/1970 | Pawl et al. | 318/138 |
| 3,601,678 | 8/1971 | Abraham | 318/254 |
| 3,636,429 | 1/1972 | Jukubowski | 318/696 |

Primary Examiner—Simmons, G. R.
Attorney, Agent, or Firm—Wolfe, Hubbard, Leydig, Voit & Osann, Ltd.

[57] ABSTRACT

A closed-loop control system for a step motor which is started by a pulse from an external source, and then driven by feedback pulses from a transducer connected to the motor output. Each time the motor advances a step, the transducer generates a feedback pulse at a reference switching angle which determines the torque output of the motor and, therefore, the motor speed for any given load. An adjustable time delay is provided in the feedback loop for adjusting the effective switching angle at which the feedback pulses are applied to the drive unit of the motor, by delaying the feedback pulses. To automatically stabilize the motor at a selected speed, a signal representing the desired speed is compared with the actual motor speed, and an error signal is generated representing any difference between the actual and desired speeds. This error signal is then used to automatically select the magnitude of the time delay introduced into the feedback loop. The error signal may represent only the direction of the error, and the time delay means adjusted by a fixed unit of time after each motor step in the direction required to return the actual motor speed toward the desired motor speed. Alternatively, the error signal may represent both the magnitude and direction of the error, and the time delay adjusted in proportion to the magnitude of the error and in the direction required to return the actual motor speed to the desired motor speed. The system also includes means for automatically stopping the motor after a predetermined number of steps, and means for generating decelerating and/or damping pulses after termination of the feedback pulses.

23 Claims, 9 Drawing Figures

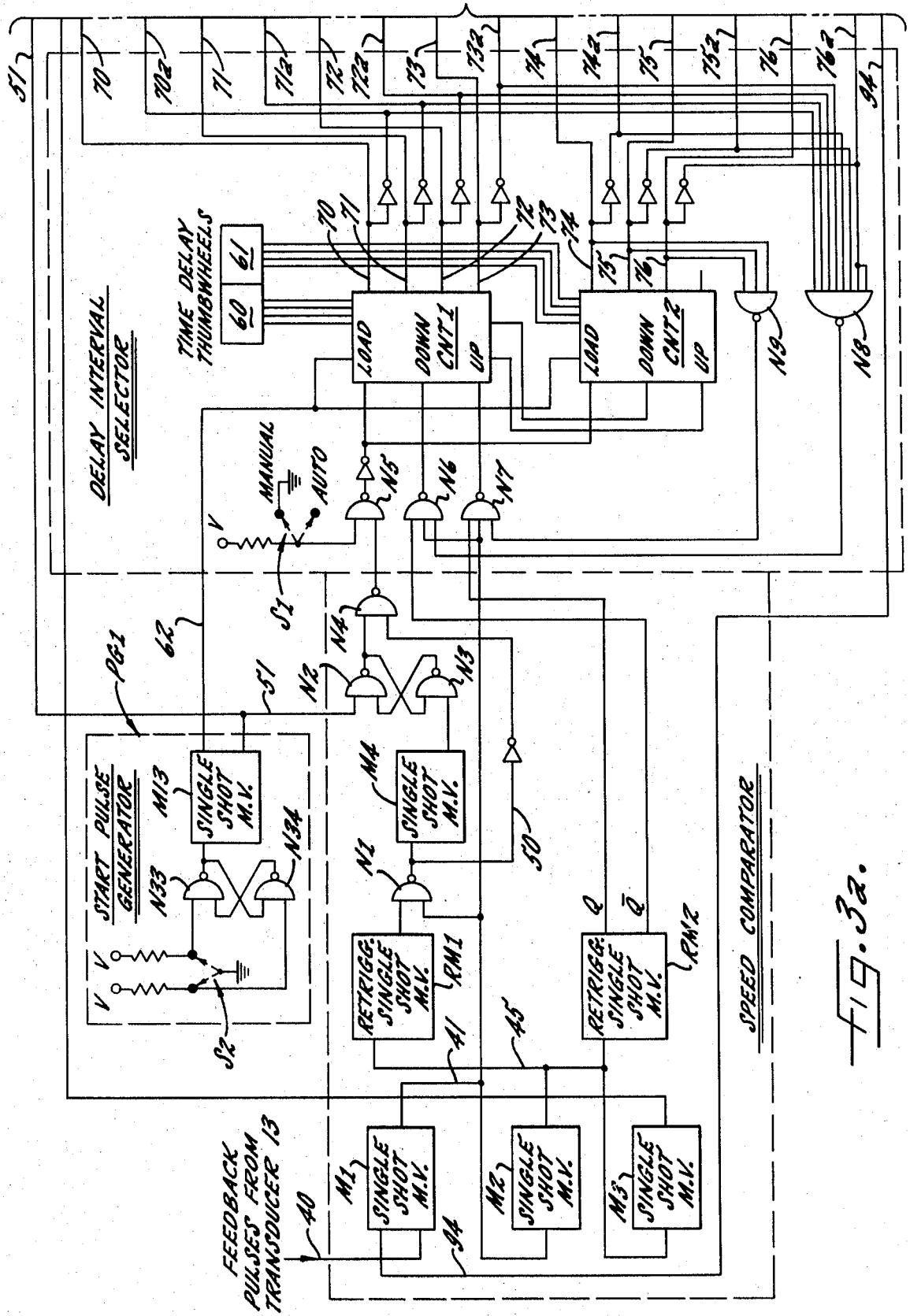

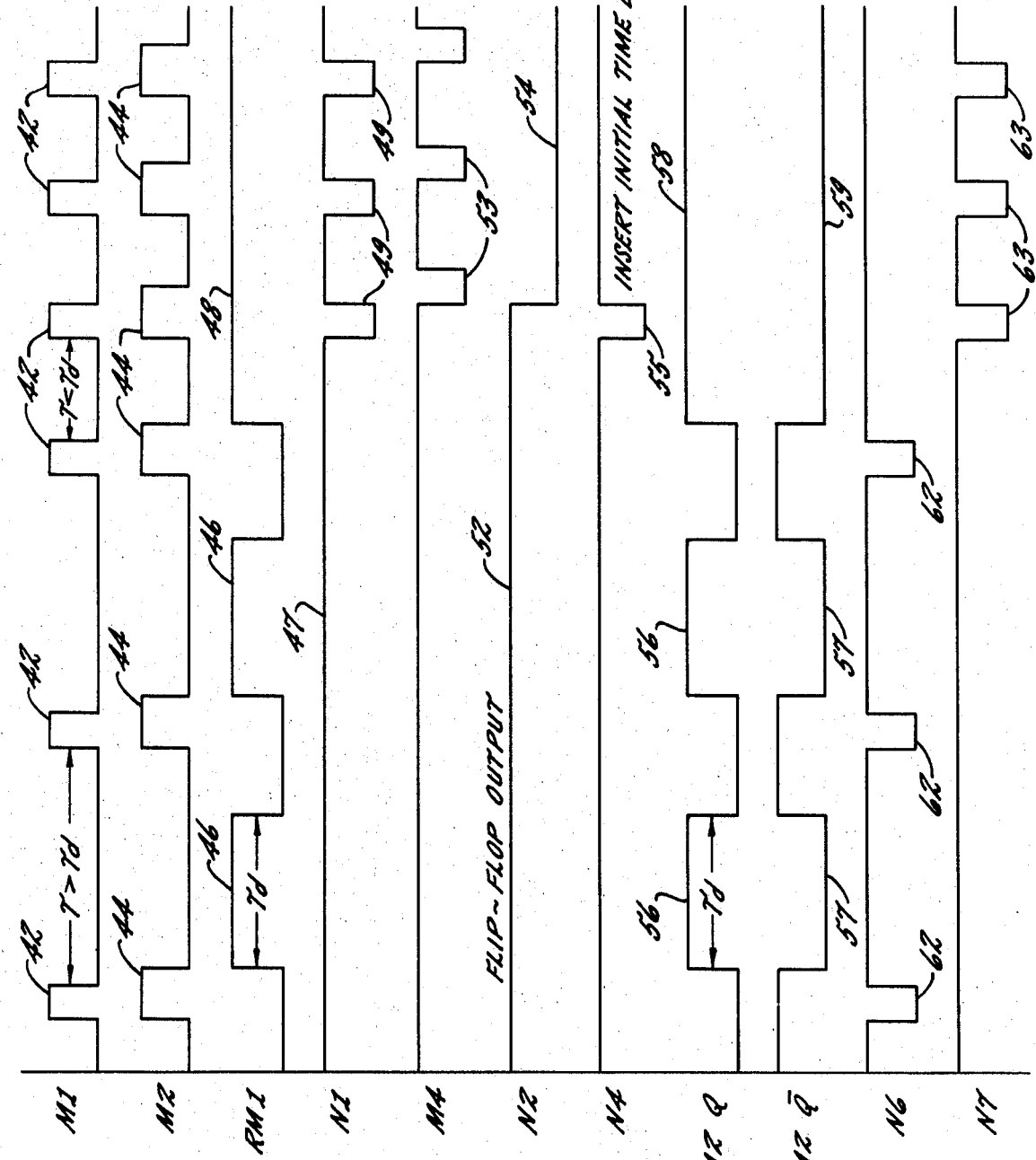

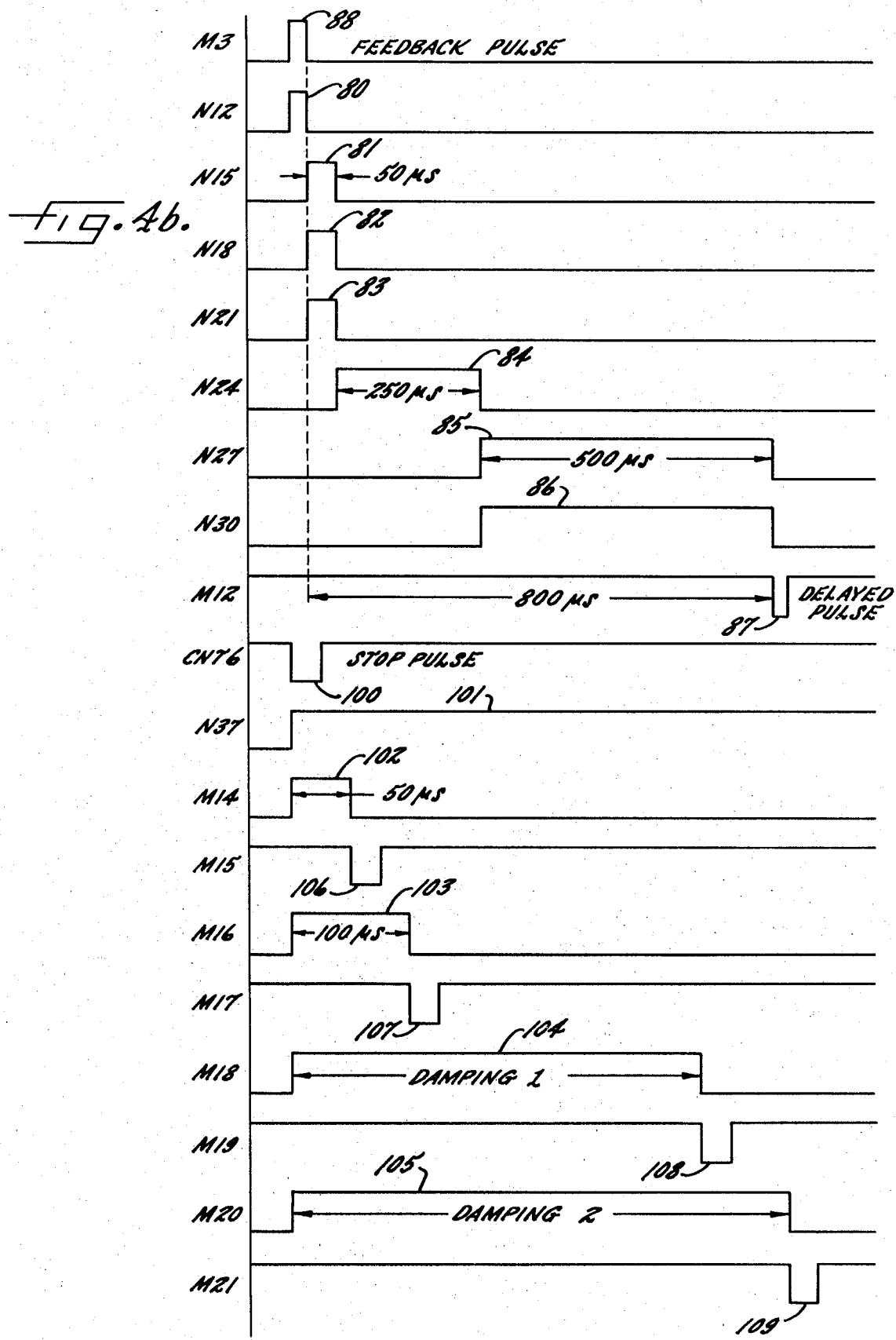

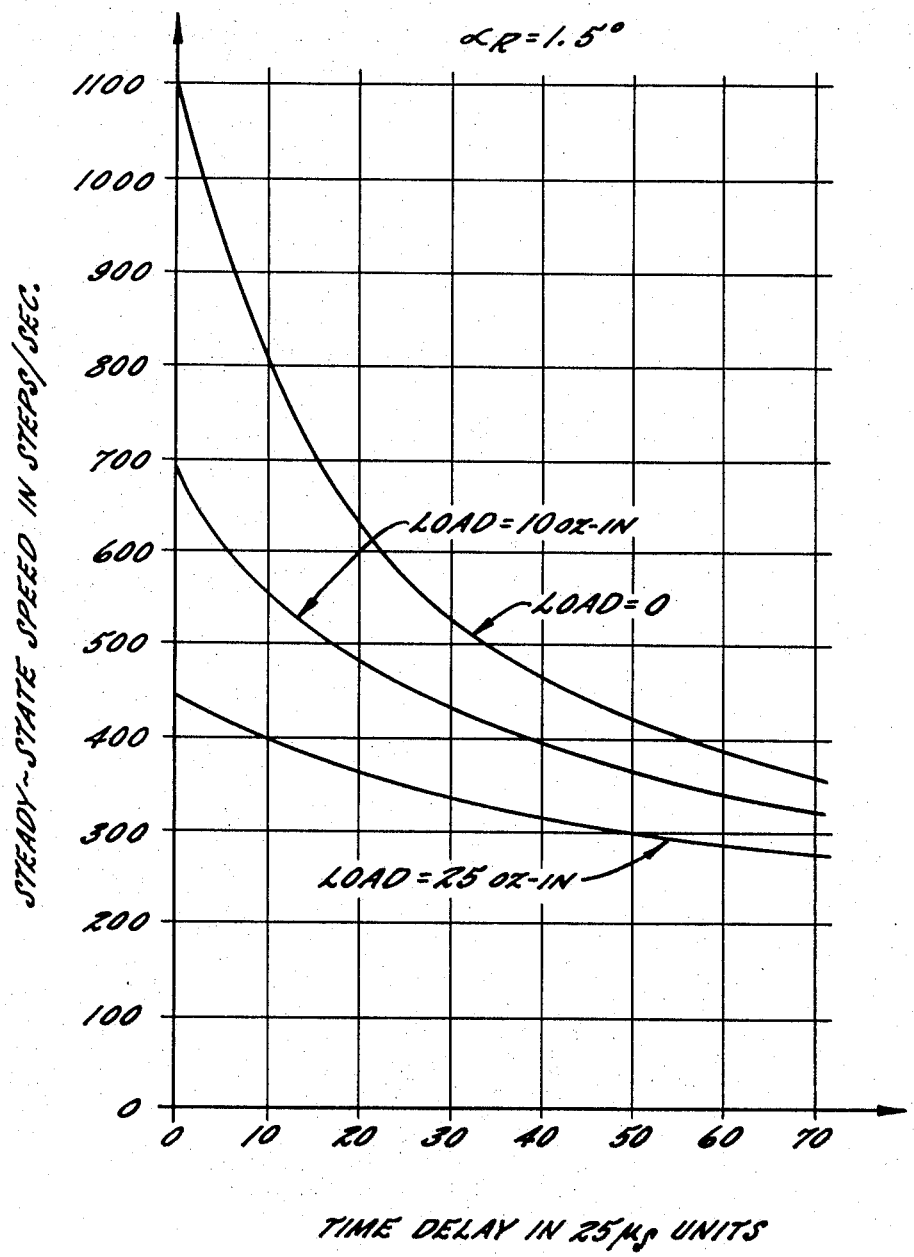

CLOSED-LOOP SPEED CONTROL FOR STEP MOTORS

DESCRIPTION OF THE INVENTION

The present invention relates generally to step motors, and, more particularly, to closed-loop control systems for step motors.

It is a primary object of the present invention to provide an improved closed-loop control system for a step motor which permits the speed of the motor to be regulated. In this connection, it is a related object of the invention to provide such a control system which permits the use of the step motor in applications that require a constant speed drive as well as a stepping drive with precise positioning accuracy.

Another object of the invention is to provide such an improved step motor control system which can be operated in either a manual mode, in which the speed of the motor is regulated by a manual adjustment in the control system, or an automatic mode, in which the speed of the motor is regulated automatically by the control system without any manual operations. A more specific object of the invention is to provide such a control system which is capable of automatically stabilizing the speed of a step motor in the face of current and load fluctuations.

A further object of the invention is to provide an improved step motor control system of the type which is capable of controlling both the transient and the steady-state speeds of the motor. In this connection, one specific object of the invention is to provide such a control system which improves the transient speed response of the motor without excessive speed overshoot.

Yet another object of the invention is to provide such an improved step motor control system which is capable of automatically stopping the motor after a preselected number of steps.

A still further object of the invention is to provide an improved step motor control system of the type described above which automatically decelerates the motor, with automatic damping if desired, after the application of driving impulses to the motor has been terminated.

Other objects and advantages of the invention will be apparent from the following detailed description and the accompanying drawings, in which:

FIGS. 3a and 3b are a more detailed block diagram of one particular embodiment of the system illustrated generally in FIG. 1;

FIGS. 4a and 4b are timing diagrams illustrating exemplary and somewhat idealized waveforms at various points in the system of FIGS. 3a and 3b;

FIG. 5 is a graph showing variations in motor speed as a function of the magnitude of the time delay, at different motor loads, in the system of FIGS. 3a and 3b;

While the invention will be described in connection with a certain preferred embodiment, it will be understood that it is not intended to limit the invention to this particular embodiment. On the contrary, it is intended to cover all alternatives, modifications and equivalent arrangements as may be included within the spirit and scope of the invention as defined by the appended claims.

Figure 1:
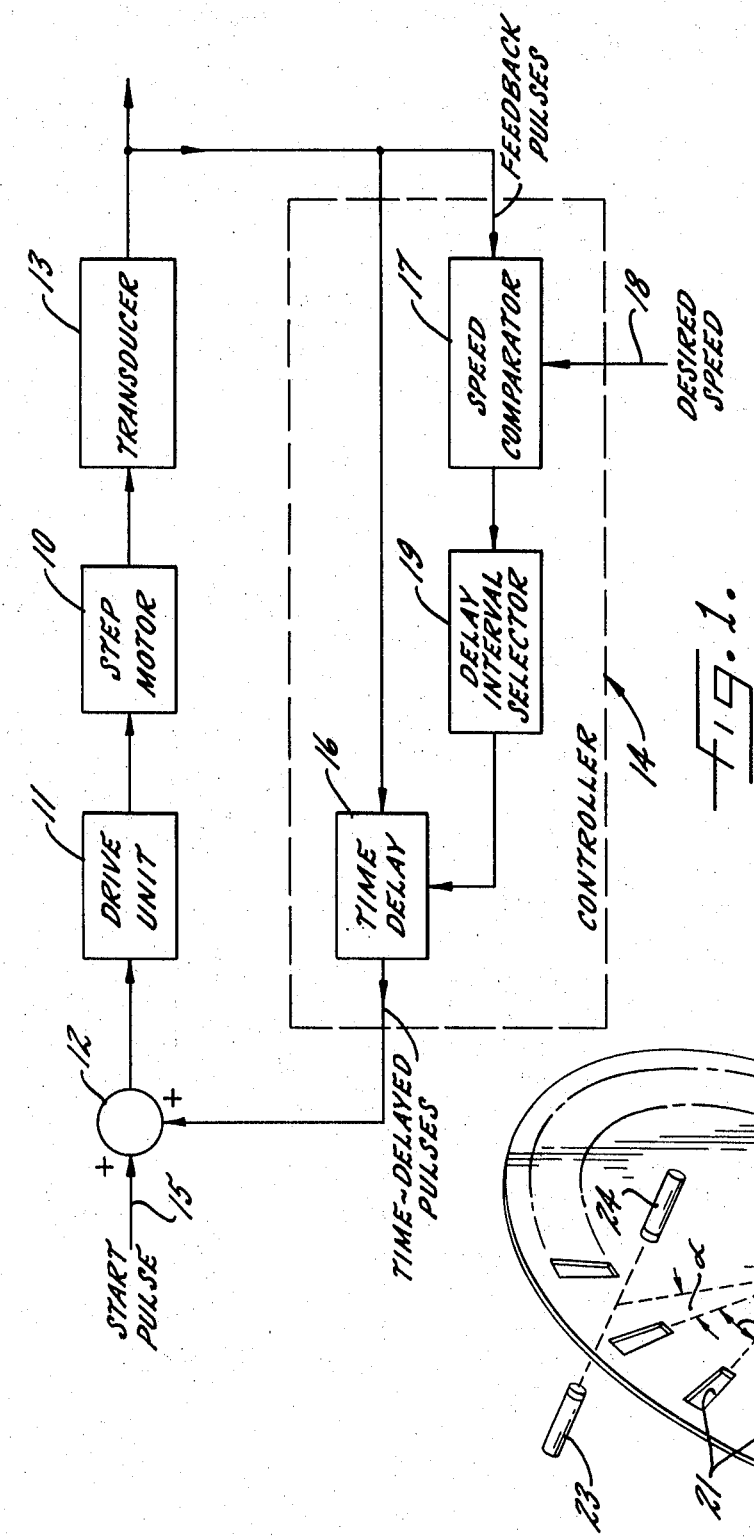
FIG. 1 is a block diagram of a closed-loop step motor control system embodying the invention.

Turning now to the drawings and referring first to FIG. 1, a step motor 10 is driven by a conventional drive unit 11 which responds to successive input pulses from a summing point 12 to advance the motor one step for each pulse. Each time the motor 10 steps, a transducer (or encoder) 13 connected to the motor output generates a feedback pulse which is fed back to the summing point 12 through a control system 14, and these feedback pulses are then applied to the drive unit 11 to continue the stepping movement of the motor as long as the flow of feedback pulses continues. To start the motor, a single start pulse is supplied to the summing point 12 via line 15 from a source outside the feedback loop, and is then applied to the drive unit 11 to produce the first step and, therefore, the first feedback pulse. The operation described thus far is a conventional closed-loop step motor system, and all the components referred to are conventional and well known in the step motor art. For example, the motor 10 may be a type SMO48 step motor made by Warner Electric Brake and Clutch Company (Beloit, Wisconsin), which is a three-phase motor designed to step in increments of 7.5°. The drive unit 11 and transducer 13 for use with this particular motor are also made by Warner Electric Brake and Clutch Company and are identified as MCS-1808 and MCS-1600, respectively.

Figure 2:
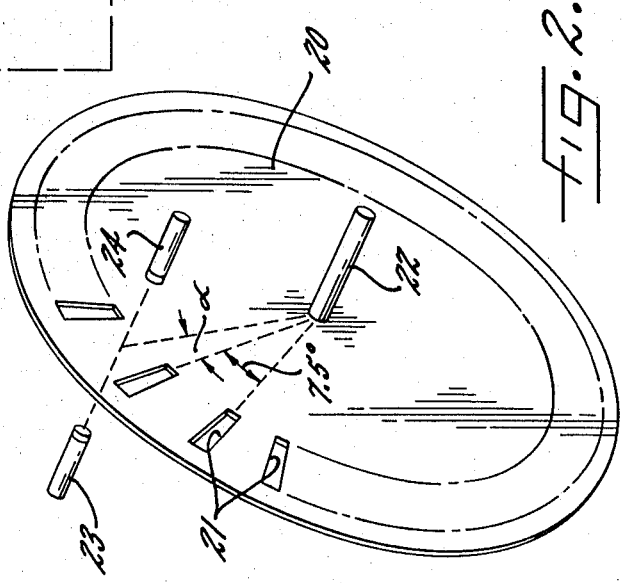
FIG. 2 is a diagrammatic perspective view of an exemplary photoelectric transducer for use in the system of FIG. 1.

In closed-loop operation of a step motor, the effective torque produced by the motor and the rate at which the motor advances are determined by the "switching angle," which is the angle between the end of one motor step and the point at which the feedback pulse is generated to produce the next step. To facilitate an understanding of the significance of the switching angle, there is illustrated in FIG. 2 an exemplary transducer 13 comprising a disc 20 with 48 equally spaced radial slots 21 mounted on the motor output shaft 22. The disc 20 is monitored photoelectrically by a light source 23 on one side of the disc and a photoelectric sensor 24 on the other side, so that an electrical pulse is generated by the sensor 24 each time one of the slots 21 passes the sensor, or each time the disc rotates 7.5°. Step motors typically have a detent reference position, which is the stable position of the motor output shaft at the end of a step, and it is the position of the light source 23 and 24 relative to this detent reference position and the slot 21 that determines the switching angle of a closed-loop system using the transducer of FIG. 2. This switching angle has been designated $\alpha$ in FIG. 2, and it determines the point on the motor torque curves at which the drive unit 11 switches phases to advance the motor another step. Consequently, the switching angle establishes a running torque curve for the motor, and the torque in turn determines the steady-state speed of the motor. That is, the motor will always accelerate until it attains a steady-state speed at which the average torque balances load friction. In the steady-state, therefore, the switching angle determines the motor speed for any given load. However, if the motor load varies, the motor speed also varies.

In accordance with one important aspect of the present invention, the feedback loop of the step motor control system includes means for delaying the feedback pulse to vary the effective switching angle of the system. More specifically, the delay means varies the time relationship between the feedback pulses and the stepping movement of the motor so as to vary the torque produced by the motor, thereby varying the motor speed for any given load. Thus, in the illustrative system of FIG. 1, a time delay means 16 is provided in the feedback loop between the transducer 13 and the summing point 12. The effect of the time delay means 16 is to electronically adjust the effective switching angle by adding a supplemental switching angle to the basic reference switching angle established by the transducer 13. Thus:

$$A = A_R + A_S$$

where
 A = effective switching angle,
 $A_R$ = reference switching angle established by transducer 13,
 $A_S$ = supplemental switching angle due to time delay.

The supplemental switching angle $A_S$ is a function of both the length of the time delay and the motor speed, since $A_S$ represents the angle traversed by the rotor of the step motor during the time delay interval. Thus:

$$A_S = 360/N \, WT$$

where
 N = number of motor steps per revolution,
 W = step motor speed in steps per second,
 T = time delay in seconds.

Therefore $A = A_R + 360/N \, WT$.

In accordance with a further aspect of the invention, the time delay means is used to control the speed of the step motor by adjusting the time delay interval until the feedback pulses are generated at a rate corresponding to a prescribed reference rate representing a desired motor speed. Thus, in one application of the invention the time delay means is used to stabilize the motor speed in the face of variations in the motor load by monitoring the actual motor speed, generating an error signal whenever the actual speed deviates from a preselected desired speed, and automatically adjusting the time delay means in accordance with the error signal to return the actual motor speed toward the desired speed. Thus, in the particular system illustrated in FIG. 1 a speed comparator 17 receives a reference signal representing a preselected desired motor speed on line 18, and this signal is continuously compared with the actual motor speed as represented by the rate of generation of the feedback pulses from the transducer 13. Whenever the actual speed deviates from the desired speed, the comparator 17 generates an error signal representing the magnitude of the deviation, and this error signal is fed to a delay interval selector 19 which responds to the error signal by adjusting the delay interval to return the actual motor speed toward the desired speed. More specifically, the selector 19 generates an output signal representing the selected delay interval, and this output signal is fed to the time delay means 16 to automatically effect a time delay of the selected interval.

It will be appreciated that the time delay can only increase the switching angle beyond the reference switching angle $A_R$, and, therefore, can only decrease the motor speed produced with the reference switching angle $A_R$ and a maximum load on the motor. Consequently, the reference angle established by the transducer 13 must be sufficiently small that the maximum desired motor speed is less than the speed that can be obtained with the maximum load and a switching angle of $A_R$. That is, the speed can be decreased from that obtained with a switching angle of $A_R$ and a maximum load, but it can never be increased beyond that level.

The error signal generated by the comparator 17 determines whether the time delay in the feedback loop is to be increased or decreased after each motor step. This time delay may be adjusted by fixed units after each step, regardless of the magnitude of the speed error, or the magnitude of the adjustment may be proportional to the magnitude of the speed error. In the fixed-unit time delay adjustment, the time for the $(n+1)st$ step interval is $$T_{M+1} = T_M + \Delta T \text{ if } W_M > W_d$$
$$T_{M+1} = T_M - \Delta T \text{ if } W_M < W_d$$
$$T_{M+1} = T_M \text{ if } W_M = W_d$$

where
 $T_M$ = time delay during the $M^{th}$ step interval,
 $\Delta T$ = the fixed unit time delay,
 $W_M$ = average motor speed for the $M^{th}$ step,
 $W_d$ = desired motor speed.

In this type of system, the accuracy of the final steadystate speed depends on the value selected for $\Delta T$. However, there are practical limits to the values that can be selected for $\Delta T$ because if it is too small the system may respond too slowly to speed changes since it can change the time delay by only one unit after each step; if the value selected for $\Delta T$ is too large, the feedback loop becomes ineffective since speed changes are compensated for only after the time interval $T_M$ and, consequently, the speed may oscillate even without any change in the motor load. For the exemplary step motor mentioned previously, it has been found that a suitable value for $\Delta T$ is 1 millisecond.

Figure 3B:
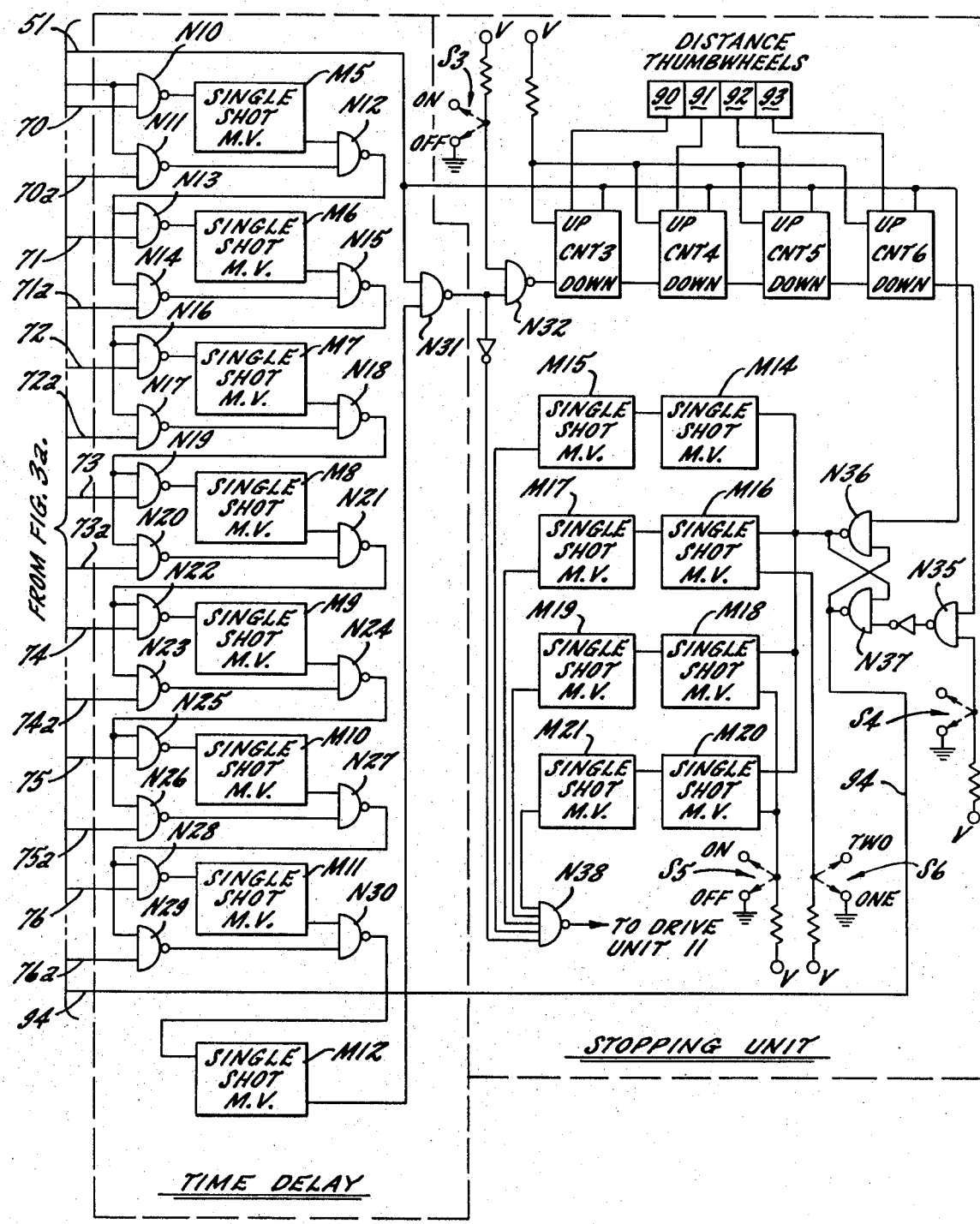

In FIGS. 3a and 3b there is shown a logic diagram of a speed control system corresponding to the block diagram of FIG. 1 for making fixed-unit adjustments in the time delay means. In this system, the feedback pulses generated by the transducer 13 in response to the step motor output are supplied via line 40 to a monostable (single shot) multivibrator M1 included in the speed comparator portion of the system.

To start the motor a pulse generator PG1 produces simultaneous output pulses on lines 62 and 51 in response to manual actuation of a pushbutton switch S2. This switch normally grounds the "set" input of a flip flop formed by a pair of NAND gates N33 and N34. When the switch S2 is depressed, the "reset" input of the flip flop is momentarily grounded, thereby producing a negative pulse at the output of gas N33. This pulse triggers a monostable (single shot) multivibrator M13), thereby producing a positive pulse on output line 62 and the complement thereof (a negative pulse) on output line 51.

In accordance with one specific aspect of the present invention, the reference switching angle is made substantially smaller than the switching angle required to provide the desired steady-state speed, the time delay in the feedback loop is initially set equal to zero to achieve the minimum switching angle (the reference angle) and maximum acceleration, and a preselected time delay is introduced at a preselected transient speed to reduce the amount of speed overshoot when the motor reaches the desired steady-state speed. In the illustrative system, the particular transient speed at which the preselected time delay is introduced is determined by a first retriggerable monostable multivibrator RM1 which receives input signals from a monostable multivibrator M2 connected to the previously mentioned multivibrator M1. The multivibrator M1 responds to each feedback pulse from the transducer 13 to produce a well shaped pulse of constant duration on its output line 41. The output of the multivibrator M1, which is represented by the pulses 42 in FIG. 4a, is applied to a NAND gate N1, and to a second multivibrator M2. In response to each pulse received from M1, the multivibrator M2 produces a corresponding pulse of slightly longer duration than the output pulses 42 from M1, as represented by pulses 44 in FIG. 4a. These output pulses 44 are applied via line 45 to a retriggerable monostable multivibrator RM1 which responds to each such input pulse to produce an output pulse 46 (FIG. 4a) having a predetermined width. That is, each time the retriggerable monostable multivibrator RM1 receives an input pulse 44, its output switches from low to high, remains at the high level for a predetermined time interval, and then automatically switches back to the low level. This output of the retriggerable multivibrator RM1 supplies a second input to the NAND gate N1.

As can be seen most clearly from the pulse diagram in FIG. 4a, as long as the interval between successive output pulses 44 from the multivibrator M2 is longer than the constant predetermined duration of the output pulses 46 from RM1, the output of the NAND gate N1 remains constant, as indicated by the constant high signal 47 in FIG. 4a. However, as soon as the frequency of the feedback pulses being fed to the multivibrator M1 increases to a point where the time interval between successive output pulses 44 from M2 is less than the duration of the output pulses 46 from RM1, the multivibrator RM1 is successively retriggered while its output is at the high level, thereby maintaining the output at this level to produce a quasi-stable state in which the output of RM1 remains constant at the high level as long as RM1 continues to receive input pulses at intervals less than the width of the pulses 46. The continuous output signal produced by RM1 in this quasi-stable state is indicated at 48 in FIG. 4a.

As long as the output of the multivibrator RM1 remains high, the output of the NAND gate N1 is switched to its low level each time one of the pulses 42 is generated by M1, thereby producing a series of negative-going pulses 49 in synchronism with the output pulses 42 from M1. Thus, it can be seen that the system as described thus far provides a means of determining when the transient speed of the step motor, as represented by the rate at which the feedback pulses are supplied to M1, reaches a preselected level at which it is desired to introduce an initial time delay to reduce the amount of speed overshoot at the desired steady-state speed level.

In order to introduce the preselected initial time delay into the feedback loop to increase the switching angle, the output of the gate N1 is applied via line 50 to a NAND gate N4 which is enabled by the normal high output from a flip flop composed of a pair of NAND gates N2 and N3. Since the only purpose of this portion of the system is to introduce an initial time delay in the feedback loop, the output from the gate N4 should be produced only once during each start-up of the step motor. Accordingly, to insure the uniqueness of the output from the gate N4, the output of gate N1 triggers a monostable multivibrator M4 to reset the flip flop formed by gates N2 and N3. When the motor is first started, the start pulse generator PG1 supplies a "start" pulse to the NAND gate N2 via line 51 to set the flip flop N2, N3 to produce a high output signal 52 from gate N1. Then when the output of gate N1 is first switched to its low level, the resulting negative pulse 49 combined with the high level signal 52 from gate N2 causes the output of gate N4 to switch to its low level until the flip flop N2, N3 is reset by the first output pulse 53 from multivibrator M4, thereby switching the output of gate N2 to its low level (indicated at 54 in FIG. 4a) and returning the output of gate N4 to its high level. Thus, the output of gate N4 forms a negative-going pulse 55 which ss used to insert the initial time delay interval in the feedback loop, as will be discussed in more detail below. Since the flip flop formed by gates N2 and N3 is never set again until another start pulse is applied to gate N2, none of the succeeding pulses from the multivibrator M4 have any effect on the output of gate N4, so that the N4 output signal remains at the high level, as illustrated in FIG. 4a.

For the purpose of detecting when the actual motor speed reaches a preselected steady-state speed, a second retriggerable multivibrator RM2 produces output pulses 56 and 57 of predetermined width in response to the output pulses 44 from multivibrator M2. The output pulse 57 goes from high to low in response to the trailing edge of each input pulse 42 and is simply the complement of output pulse 56, which goes from low to high in response to the trailing edge of each input pulse 42. To simplify subsequent references to these output signals, the pulses 56 and 57 will sometimes be referred to as the Q and $\bar{Q}$ outputs, respectively. The multivibrator RM2 functions in the same manner as the first retriggerable multivibrator RM1 described above, so that the output of RM2 returns to its stable state following each triggering thereof as long as the time interval between successive pulses 44 is longer than the constant predetermined duration of the output pulses 56 and 57 generated by RM2. However, as soon as the frequency of the feedback pulses being fed to the multivibrator M1 increases to a point where the time interval between successive pulses 44 becomes less than the duration of the output pulses 56 and 57, the multivibrator RM2 is successively retriggered while its output is at the high level, thereby producing a quasistable state in which the output of RM2 remains constant at the high level as long as RM2 continues to receive input pulses at intervals less than the width of the pulses 56 and 57. The continuous Q and $\bar{Q}$ output signals produced by RM2 in this quasistable state are indicated at 58 and 59 in FIG. 4a.

Turning next to the time delay selector portion of the system shown in FIG. 3a, this portion of the system includes two conventional up-down counters CNT1 and CNT2. There are two modes of operation of the time delay selector, and one or the other of these modes is selected by the position of a switch S1. When the switch S1 is in the "manual" position, the "load" input to the counters CNT1 and CNT2 is continuously grounded so that the outputs of the two counters are maintained equal to their inputs. In this mode, the magnitude of the time delay is maintained at a constant value fixed by two sets of thumbwheels 60 and 61 each of which is connected to the input terminals of one of the two counters. In this "manual" mode, the counter outputs continuously represent the number determined by the settings of the thumbwheels, and these output signals are fed to the time delay portion of the system to maintain a constant time delay in the feedback loop, as will be described in more detail below. If it is desired to change the time delay to adjust the motor speed, the thumbwheels 60 and/or 61 must be manually adjusted to change the counter outputs.

The second mode of the time delay selector is the "automatic" mode which is selected by positioning the switch S1 in its automatic position. In this mode, the two counters CNT1 and CNT2 are initially cleared each time the motor is started by a "start" pulse produced on output line 62 from the start pulse generator PG1. The counter outputs then remain at zero until the pulse 55 is generated by the gate N4. When the pulse 55 arrives at the "load" terminals of the two counters, the counters are initially loaded with the initial time delay value set on the thumbwheels 60 and 61, but the input signals from the thumbwheels 60 and 61 have no further effect on the counters after the pulse 55 is terminated. From this point on, signals from a pair of NAND gates N6 and N7 cause the two counters to count either up or down whenever the stepping rate of the step motor becomes faster or slower than the preselected stepping rate. More specifically, a fast step causes the counters to count up to increase the time delay (thereby increasing the effective switching angle to decrease the motor speed), and a slow step causes the counters to count down to decrease the time delay (thereby decreasing the effective switching angle to increase the motor speed).

Each of the up-down counters CNT1 and CNT2 has the conventional count-down and count-up inputs. The application of signals to these inputs is controlled by a pair of gates N6 and N7 connected to the count-down and count-up inputs, respectively, of the first counter CNT1, and the corresponding inputs of the second counter are interconnected with the first counter in the usual fashion. A common input to both gates N6 and N7 is the output of the multivibrator M1, i.e., the pulses 42 which are produced in synchronism with the feedback pulses representing the stepping rate of the motor. A second input to each of the gates N6 and N7 is derived from the retriggerable multivibrator RM2, with the Q output of RM2 being applied to the gate N7 and the Q̄ output of RM2 being applied to gate N6. The third inputs to the gates N6 and N7 are derived from gates N9 and N8, respectively, and enable the gates N6 and N7 as long as the counts produced by the counters CNT1 and CNT2 do not exceed prescribed limits, as will be described in more detail below.

As can be seen most clearly from the timing diagram in FIG. 4a, a pulse is transmitted by either one or the other of the two gates N6 and N7 to either the count-down or count-up input of the counter CNT1 in response to each output pulse 42 from M1. The time relationship between the pulses 42 from M1 and the pulses 56 and 57 generated by RM2 provides an indication of whether the stepping motor is stepping too fast or too slow and, therefore, whether the input to the counters is applied to the count-up input or the count-down input of counter CNT1. As can be seen in FIG. 4a, when the stepping rate is slower than the desired rate represented by the width Td of the output pulses 56 and 57 from RM2, the Q output of RM2 is high when the pulse 42 arrives at the gate N6; consequently, gate N6 applies a negative-going pulse 62 to the count-down input of the counter CNT1 in response to each pulse 42 from the multivibrator M1. This causes the counters to count down by one unit after each step of the motor, thereby decreasing the time delay so as to decrease the effective switching angle and increase the stepping rate. Conversely, when the stepping rate is faster than the desired rate, the time interval between successive pulses 44 from multivibrator M2 is shorter than the duration of the output pulses 56 and 57 from RM2, and thus RM2 is in its quasi-stable state whenever a pulse 42 arrives at the gates N6 and N7. Consequently, the Q output of RM2 is high whenever a pulse 42 arrives at gate N7, and thus gate N7 applies a negative-going pulse 63 to the count-up input of the counter CNT1 in response to each pulse 42 from the multivibrator M1. This causes the counters to count up by one unit after each step of the motor, thereby increasing the time delay so as to increase the effective switching angle and reduce the stepping rate of the step motor.

When the step motor is first started and the switch S1 is in the "automatic" position, the counters are initially cleared to zero as described above. However, while the motor is accelerating, the time relationship of the pulses 42 from M1 and the pulses 56 and 57 from RM2 is such that a signal would be transmitted through gate N6 to the count-down input of the counters, if it were not for the limiting function performed by the third input supplied to gate N6 from the NAND gate N9. This gate N9 is connected to all the output lines 70–76 from the two counters CNT1 and CNT2, and produces an output which inhibits the gate N6 whenever the outputs from both counters are all zero. Inverters are connected in all the input lines to the NAND gate N9 so that the complements of all the counter output signals are supplied to the gate N9, thereby providing an output signal of the proper level to inhibit the gate N6. Since the gate N6 remains inhibited as long as the counter outputs are all zero, it is impossible for a pulse to be applied to the count-down input of the counters until the counters have generated an output signal representing some value greater than zero.

The gate N6 is first enabled when the initial time delay is loaded into the counters CNT1 and CNT2 in response to the output pulse 55 from gate N4. The gate N6 is thus enabled before the motor reaches its steady-state speed, and any output signals produced by N6 during the transient interval when the motor is still accelerating to its steady-state speed effect a reduction in the initial time delay. This is theoretically an undesirable effect since any reduction in the initial time delay tends to increase the overshoot of the motor speed when it reaches the steady-state level, but in actual practice the motor reaches its steady-state speed so quickly after the initial time delay is introduced into the feedback loop that the effect of the gate N6 in this transient interval is negligible.

An upper limit must also be established for the counters so that the counter output does not exceed the total number of delay units that can be represented by the time delay portion of the system to be described below. Accordingly, a second NAND gate N8 is connected to the particular counter output lines which represent the maximum number of delay units that can be generated by the downstream portion of the system. When ths maximum count is reached, the resulting output signal from the gate N8 inhibits gate N7 so that no further signals can be applied to the count-up input of the counters until the count has been reduced by "count-down" signals from the gate N6.

Turning next to the time delay portion of the system illustrated in FIG. 3b, a gated array of seven monostable multivibrators M5 through M11 are connected to the seven output lines 70-76 from the counters CNT1 and CNT2. More specifically, the first four multivibrators M5-M8 in the illustrative system are connected to the four output lines 70-73 from counter CNT1, and the remaining three multivibrators M9-M11 are connected to the three output lines 74-76 from counter CNT2. Each of these multivibrators M5-M11 and the three gates associated with each multivibrator function in exactly the same manner, except that each multivibrator generates an output pulse having a different width. Thus, in one example of the illustrative system, M5 produces an output pulse having a width of 25 microseconds, M6 produces a pulse of 50 microseconds, M7 a pulse of 100 microseconds, M8 a pulse of 200 microseconds, M9 a pulse of 250 microseconds, M10 a pulse of 500 microseconds, and M11 a pulse of 1,000 microseconds.

Taking the first multivibrator M5 by way of example, the input to this multivibrator is the output of a NAND gate N10 having two inputs, one of which is the output of the multivibrator M3, which produces pulses in synchronism with the feedback pulses from transducer 13, and the other of which is the signal on output line 70 from counter CNT1. If the signal on line 70 is high, representing a count of predetermined magnitude, the generation of a pulse by M3 triggers the multivibrator M5 to produce a $\bar{Q}$ output pulse having a width of 25 microseconds. This output pulse passes through a NAND gate N12 and on to the inputs of gates N13 and N14 associated with the next multivibrator M6. In the event that the counter output is such that the signal on line 70 is low when an output pulse from multivibrator M3 arrives at gate N10, then a high signal is necessarily present on counter output line 70a, which receives the same counter output signal as line 70 but passed through an inverter. The high signal on line 70 permits the pulse from multivibrator M3 to pass through a gate N11 and on through the gate N12, which is already enabled by the high output from multivibrator M5, to the next multivibrator M6. Thus it can be seen that each pulse generated by multivibrator M3 either triggers the multivibrator M5 in the first stage of the time delay network to produce an output pulse of predetermined width, e.g., 25 microseconds, or bypasses the first-stage multivibrator M5, depending on the particular counter output existing at the time of transmission of each pulse from M3.

Each of the other six stages of the time delay network, i.e., the stages including multivibrators M6-M11, operate in the same manner as the first stage except that each of the respective multivibrators produces an output pulse of a different width, and the input signals to the two input gates of each stage are the output signal from the immediately preceding stage and a different counter output signal for each stage. More specifically, the two input gates of the six stages containing multivibrators M6-M11 are connected to counter output lines 71-76 and 71a-76a, respectively, and exemplary pulse widths produced by the multivibrators in these six stages are 50, 100, 200, 250, 500 and 1,000 microseconds. Thus, it can be seen that the particular time delay effected by the time delay network is directly dependent on the value of the counter output. For example, if the counter output has a value of 32 (or 001, 0010 in binary coded decimal form), then the pulse from M3 triggers the multivibrators in the second, fifth and sixth stages, namely multivibrators M6, M9 and M10, and bypasses the other four multivibrators M5, M7, M8 and M11, to produce a total time delay of 800 microseconds. Thus, as can be seen in FIG. 4b, the output 81 from gate N15 (M6) delays the triggering of M7 by 50 microseconds, the output of gate N24 (M9) delays the triggering of M10 by an additional 250 microseconds, and the output of gate N27 (M10) delays the triggering of M11 by an additional 500 microseconds, for a total time delay of 800 microseconds. Since one time delay unit is represented by 25 microseconds, the 800-microsecond delay represents 32 delay units. As shown in FIG. 4b, the outputs 80, 82, 83 and 86 of gates N12, N18, N21, and N30, respectively, do not contribute any time delay because the corresponding multivibrators M5, M7, M8 and M11 are bypassed in response to the counter output value of 32. Since the maximum time delay that can be introduced into the feedback loop by the illustrative system is 1,975 microseconds, it can be seen that the maximum value of the BCD output of the counters CNT1 and CNT2 is 79.

At the end of the last stage of the time delay network, the output of the final gate N30 triggers an additional monostable multivibrator M12 which produces a final time-delayed pulse 87 which is applied to a NAND gate N31. In the illustrative example of FIG. 4b, the leading edge of the pulse 87 appears 800 microseconds behind the trailing edge of the pulse 88 from multivibrator M3. In addition to the pulse from multivibrator M12, the gate N31 receives the $\bar{Q}$ output from the start pulse generator PG1 for the purpose of disabling the gate M31 during the start-up interval when the Q output of PG1 is low. After the start-up interval, the Q output of the PG1 goes high so that the gate N31 is enabled to produce the desired output whenever it receives a pulse from the multivibrator M12.

It will be appreciated at this point that the time delay introduced by the time delay network in response to the outputs of counters CNT1 and CNT2 can be varied by only one time delay unit (25 microseconds in the above example) in response to each feedback pulse from the transducer 13, because each feedback pulse can change the value of the counter outputs by only one unit. That is, if the initial time delay determined by the setting of the thumbwheels 60 and 61 is 32 units (800 microseconds in the above example), the first feedback pulse can only increase the count to 33 (if the output of RM2 causes a pulse to be applied to the count-up input of CNT1 due to excessive motor speed) or decrease the count to 31 (if the output of RM2 causes a pulse to be applied to the count-down input of CNT1 due to deficient motor speed). Of course, successive feedback pulses will continue to change the count, and thus the time delay, in either direction until the actual motor speed reaches the desired speed selected by the setting RM2, or until the limits of the time delay system are reached.

It will be recognized that the illustrative system necessarily changes the time delay by one unit after each step, regardless of whether the motor is or is not running at the desired speed. Ideally, the desired speed is midway between the speeds corresponding to two consecutive time delay values so that when the motor is operating at the desired speed the time delay network simply switches back and forth between said consecutive time delay values. If the desired motor speed is closer to the speed corresponding to one particular time delay value the time delay network will vary the time delay over a wider, but still limited, range.

In order to stop the step motor upon completion of a desired number of steps, the output from the gate N31 is applied to a NAND gate N32, which is the beginning of the stopping unit in the illustrative system. Activation of the stopping unit is controlled by an on-off switch S3 connected to the second input to gate N32. When this switch is in the "off" (down) position, the second input to N32 is grounded to disable the gate N32, so that any pulses arriving from gate N31 cannot be transmitted through gate N32. When the switch S3 is in the "on" (up) position, the gate N32 is enabled and thus the pulses arriving from gate N31 are transmitted through the gate N32 and applied to the count-down input of a counter CNT3.

The desired number of steps is preselected by setting a bank of four thumbwheels 90–93 connected to four counters CNT3–CNT6, respectively, which are interconnected in a conventional manner to form a four-stage decimal down counter. More specifically, the count-up inputs of all four counters CNT3–CNT6 are tied to a common voltage level, the count-down input of the first counter CNT3 is connected to the output of the gate N32, and the count-down input of each of the succeeding counters CNT4, CNT5, and CNT6 is connected to the borrow output of the immediately preceding counter. During each motor start-up, the counters are initially loaded with the count represented by the setting of the four thumbwheels 90–93 (maximum count of 9,999) in response to the $\bar{Q}$ output of the start pulse generator PG1. Thereafter, the original count established by the setting of the thumbwheels 90–93 is reduced by one each time a pulse is transmitted through the gate N32, and this process continues until the count is reduced to zero.

When the count stored in the counters CNT3–CNT6 has been reduced to zero, i.e., when the desired number of steps has been taken by the motor, the last counter CNT6 generates a "stop" pulse 100 (FIG. 4b) at its borrow output, and this pulse is transmitted through a gate N35 to reset a flip flop composed of a pair of NAND gates N36 and N37. This flip flop is initially set by the same $\bar{Q}$ output from the start pulse generator PG1 which loads the counters CNT3-CNT6. When the flip flop is reset by the signal from gate N35, the output goes from low to high, as indicated at 101 in FIG. 4b, thereby disabling the multivibrator M1 via line 94 so that no further feedback pulses can enter the control system. Of course, this also prevents any further feedback pulses from reaching the motor drive unit 11.

To permit the step motor to be stopped manually at any desired time, a manually operated pushbutton switch S4 controls the second input to the gate N35 for resetting the flip flop N36, N37 manually when desired. When the pushbutton associated with switch S4 is depressed, it momentarily grounds the input to the gate N35, thereby producing the same effect as the "stop" pulse 100 generated by the counter CNT6.

For the purpose of decelerating the step motor after the feedback pulses have been cut off from the motor drive unit 11, and for providing electronic damping of the motor if desired, four pairs of monostable multivibrators M14–15, M16–17, M18–19, and M20–21 are connected between the motor drive unit 11 and the flip flop formed by gates N36 and N37. When the flip flop is reset, the resulting output signal triggers each of the four multivibrators M14, M16, M18 and M20 to generate the four output signals 102, 103, 104, and 105 shown in FIG. 4b. At the end of each of these four signals, whose trailing edges are staggered in time as illustrated in FIG. 4b, the corresponding multivibrator M15, M17, M19 or M21 connected thereto produces a corresponding pulse 106, 107, 108 or 109 which is applied to a NAND gate N38. The outputs 102 and 103 of the first two multivibrators M14 and M16, which are illustrated in FIG. 4b with exemplary widths of 50 and 100 microseconds, respectively, are used to decelerate and stop the motor. In the case of a three-phase step motor, only the first pulse 102 is needed for deceleration and stopping, whereas both pulses 102 and 103 are needed to decelerate and stop a four-phase step motor. The first multivibrator M14 is always enabled since at least this one pulse 102 is needed to decelerate and stop any type of step motor. However, a switch S6 is provided for disabling the multivibrator M16 in the event that the second decelerating signal 103 is not needed. The switch S6 has a "two-pulse" and a "one-pulse" position, and when it is set to the "one-pulse" position it disables multivibrator M16 so that the second pulse 103 is never generated. When the switch S6 is set to the "two-pulse" position, the multivibrator M16 is enabled so that both pulses 102 and 103 are generated, for decelerating and stopping a four-phase step motor for example.

The purpose of the remaining two pairs of multivibrators M18–19 and M20–21 is to provide electronic damping. This damping function is not needed for all step motors or all applications, and thus a switch S5 is provided for enabling or disabling these two pairs of multivibrators. When the switch S5 is in the "on" position, both multivibrators M18 and M20 are enabled so as to produce the output signals 104 and 105, thereby triggering the corresponding multivibrators M19 and M21 to produce the final output pulses 108 and 109, respectively. The width of the pulses 104 and 105, and the time relationship therebetween, may be varied (depending on the initial motor speed and the type of motor used in a given application) by adjusting the time constants of the multivibrators M18 and M20.

The outputs of all four of the multivibrators M15, M17, M19 and M21 are applied to a NAND gate N38 along with the inverted output of the gate N31 which furnishes the primary input to the stopping unit. The output of this gate N38 is the final output signal that is applied to the motor drive unit 11 to control the stepping rate of the motor. In steady state operation, the only pulses transmitted through the gate N38 to the drive unit 11 are the time-delayed feedback pulses from gate N31. After the stop pulse 100 is generated by counter CNT6, however, the gate N38 receives no further pulses from gate N31, and the only additional signals transmitted through gate N38 are the outputs of the multivibrators M15, M17, M19 and M21. The timing of these latter pulses 106-109 relative to the stop pulse 100 causes them to have the decelerating and damping functions mentioned above.

In FIG. 5, variation of the steady state speed of an exemplary step motor is graphically illustrated as a function of time delay for three different loads. These particular curves were obtained using the system of FIG. 3, a SM-048-0150 four-phase FA step motor made by Warner Electric Brake and Clutch Company, a step angle of 7.5°, a reference switching angle of 1.5°, a field winding voltage of 40 volts, and a maximum current of 4 amperes to the motor windings. The average steady state speed was measured over the entire time delay range of 0 to 70 units for each of the three different loads of 0, 10, and 25 ounce - inches. The control system was operated in the manual mode, and the time delays were set directly by means of the thumbwheels. The speeds were measured by counting the number of feedback pulses delivered during a time interval of one second. As can be seen from the curves, a maximum speed was obtained with zero time delay at each load, and increases in the time delay gradually decreased the motor speed to the minimum speed obtained at the maximum time delay of 70 units (1,750 microseconds). It can also be seen from these curves how the motor speed can be stabilized at a selected value, e.g., 400 steps/second, by varying the time delay of the feedback pulses in accordance with variations in the load. It can be seen that the range of speeds at which the motor can be stabilized depends on both the range of time delays available and the range of loads to be placed on the motor.

Figure 6:
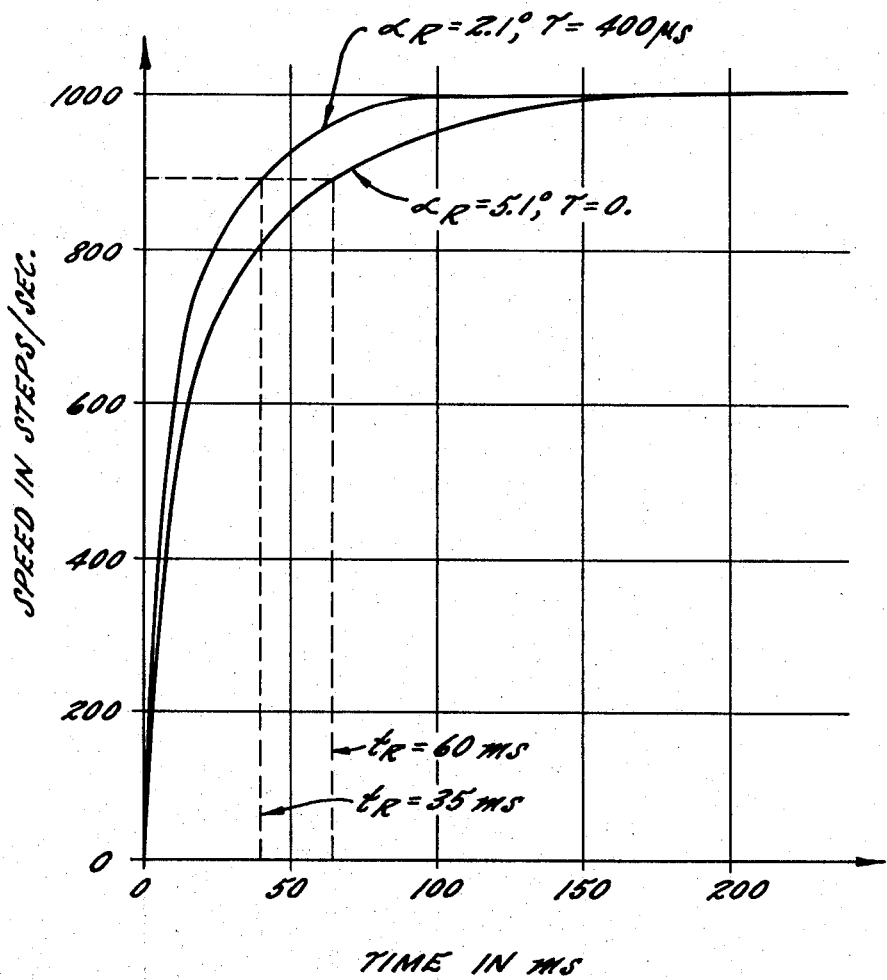
FIG. 6 is a graph showing variations in the motor speed during start-up as a function of time at two different reference switching angles, with the addition of a time delay in one case but not in the other, in the system of FIGS. 3a and 3b.

In FIG. 6, the start-up transient speed response of the same motor mentioned above is illustrated for two different switching angles, again using the system of FIG. 3. During start-up, the motor accelerates at a rate determined by the motor characteristics, the load on the motor, and the switching angle. Consequently, for any given switching angle the feedback pulses are generated at an increasing rate until a steady-state speed is reached at which load friction balances the average torque produced by the motor. However, the transient response of the motor may be varied by adjusting the effective switching angle during the transient period, e.g., to improve the speed response of the motor. More specifically, the speed response of the motor can be improved by reducing the initial switching angle, since smaller switching angles initially result in greater torque and, therefore, faster acceleration. This effect is illustrated in FIG. 6 which compares the speed response of a motor with a reference angle of 5.1° and no time delay with the response of the same motor with a reference angle of 2.1° and a 400-microsecond final time delay to provide the same steady-state motor speed as the 5.1° reference angle. It can be seen that the rise time $t_R$ (between 10 percent and 90 percent of final speed values) is significantly shorter with a smaller reference angle and more time delay.

Figure 7:
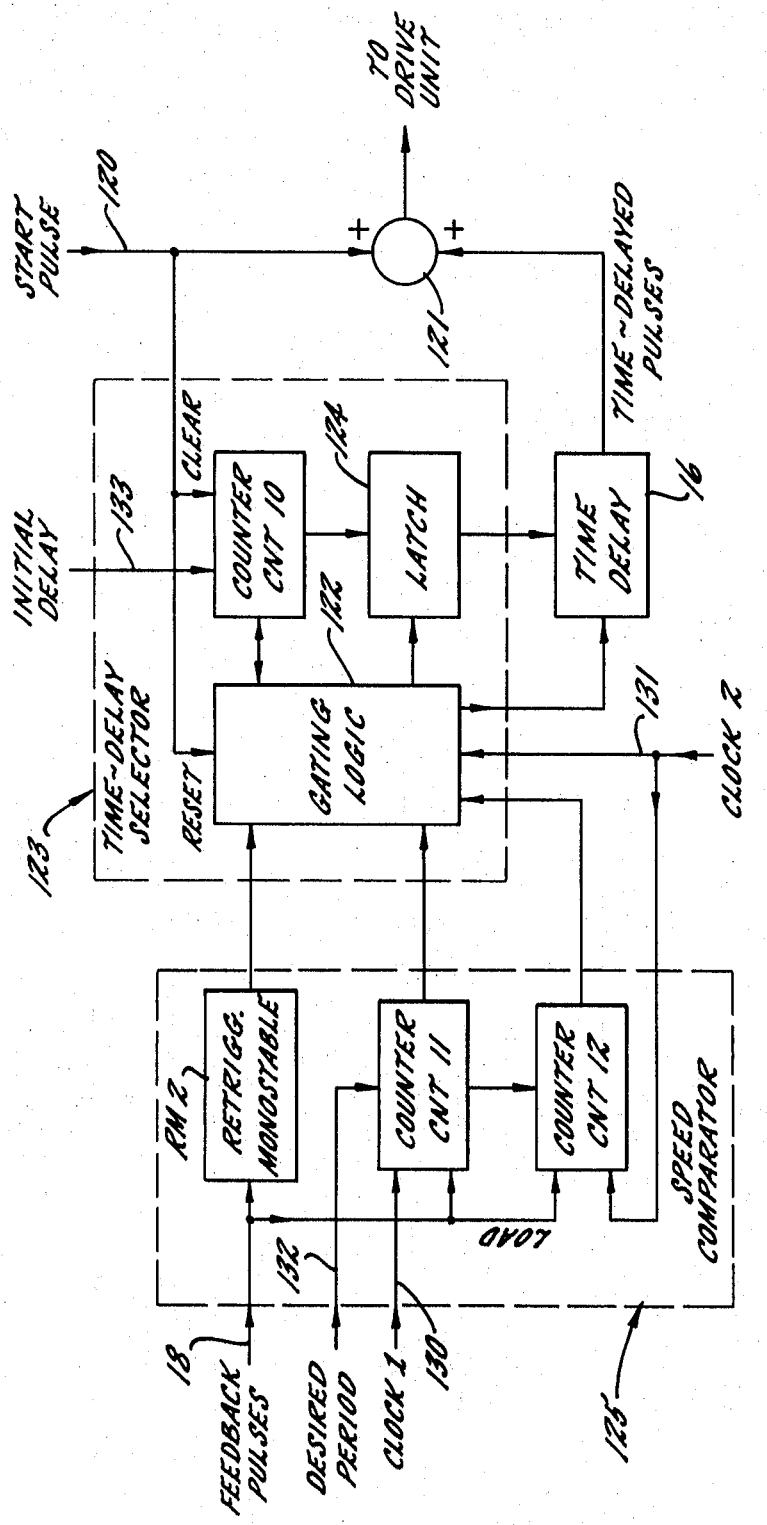
FIG. 7 is a more detailed block diagram of a modified embodiment of the system illustrated generally in FIG. 1.

In FIG. 7, a variable-unit time delay system is illustrated in block diagram form. The main difference between this system and the fixed-unit system described above is that the system of FIG. 7 measures both the magnitude and direction of the speed error (difference between actual and desired speeds) after each step of the motor, rather than merely determining the direction or sign of the error as in the fixed-unit system, and the time delay is adjusted by an amount proportional to the measured magnitude of the speed error. As in the fixed-unit system, the variable unit system of FIG. 7 uses an initial start pulse produced on line 120 by a start pulse generator to start the step motor via summing point 121. This start pulse also resets the gating logic 122 and clears the counter CNT10 in the time delay selector 123. The output of the counter CNT10 determines the amount of time delay introduced in the feedback loop, but in this system the counter output is stored in a latch 124 since the counter may change by several units (proportional to the measured speed error) in response to a single feedback pulse.

In the speed comparator 125, the magnitude of the speed error is measured by a pair of down counters CNT11 and CNT12 which count down at two different rates determined by two different clock pulse trains generated on lines 130 and 131, respectively. To select a desired stepping rate for the motor, the counter CNT11 is loaded with an initial count, via line 132, corresponding to the number of clock pulses to be counted on line 130 between successive steps. For example, if the desired stepping rate is 1,000 steps/second, or one step every 0.001 second, and the clock pulses are generated on line 130 at a rate of 100 KHZ, of 1 pulse every 0.00001 second, the count loaded into the counter via line 132 is 100. That is, 100 clock pulses represent the desired time interval between successive steps of the motor.

As soon as the counter CNT11 is loaded, it begins to count down (e.g., from 100) at a rate determined by the clock pulses on line 130 (e.g., one count every 0.00001 second.) If the count reaches zero simultaneously with the next feedback pulse on line 18, the time between successive feedback pulses is equal to the desired step period, and, therefore, the average motor speed over the step period is equal to the desired speed. However, if a feedback pulse occurs on line 18 before the count reaches zero, the time between successive feedback pulses is too short, indicating that the motor speed is faster than the desired speed. In this situation, the count remaining in counter CNT11 is loaded into counter CNT12, which immediately begins to count down to zero at a rate determined by the clock pulses on line 131. For example, if counter CNT11 has a remaining count of 10 when the feedback pulse is received, this indicates that the step interval was 10 percent, or 0.0001 second, too short, so that the time delay should be increased by 10 delay units.

Conversely, if a feedback pulse does not occur on line 18 until after the count reaches zero, the time between successive feedback pulses is too long, indicating that the motor speed is slower than the desired speed. In this case, the counter CNT11 restarts at its maximum value and continues another cycle of counting down. Then when the next feedback pulse is received by counter CNT11, the count then existing in that counter is loaded into the counter CNT12, which immediately begins to count upwards to a maximum value at the rate determined by the clock pulses on line 131.

The initial time delay is set into the counter CNT10 in the same manner described above in the system of FIGS. 3a and 3b. That is, a retriggerable multivibrator RM2 receives the feedback pulses from the transducer 13 to detect when the motor reaches a selected speed, at which time the output from RM2 causes the gating logic 122 to load the initial delay into the counter CNT10. This initial delay signal may, of course, be determined by thumbwheel settings as described above in connection with FIG. 3a.

Whenever the counter CNT12 produces an output indicating that the motor speed is too fast or too slow, this output is applied to the appropriate input of the counter CNT10 via gating logic 122 to adjust the count stored therein to increase or decrease the time delay in the feedback loop. For example, if the counter CNT12 produces an output indicating that the stepping rate is too fast, the gating logic 122 responds to this output to apply a signal to the count-up input of the counter CNT10 so as to increase the count in CNT10 by an amount proportional to the difference between the desired step interval and the actual step interval. Conversely, if the counter CNT12 produces an output indicating that the stepping rate is too slow, the gating logic 122 responds to this output to apply a signal to the countdown input of the counter CNT10 so as to decrease the count in CNT10 by an amount proportional to the difference between the actual step interval and the desired step interval. Thus it can be seen that this variable unit system always adjusts the time delay by an amount proportional to the speed error, rather than by a fixed unit, so that the error is corrected immediately rather than over a series of steps.

As can be seen from the foregoing detailed description, this invention provides an improved closed-loop control system, which permits the speed of the step motor to be regulated, thereby permitting use of the step motor in applications that require a constant speed drive as well as a stepping drive with precise positioning accuracy. The control system provided by this invention can be operated in either a manual mode, in which the speed of the motor is regulated by manual adjustment, or an automatic mode in which the speed of the motor is regulated automatically without any manual operations, and which is capable of automatically stabilizing the speed of the step motor in the face of current and load fluctuations. As described above, and as illustrated by the graphs in the accompanying drawings, the control system of this invention is also capable of controlling both the transient and the steady state speeds of the motor, and can improve the transient speed response of the motor without excessive speed overshoot. Further features of this control system are its capability of automatically stopping the motor after a preselected number of steps, and its ability to automatically decelerate the motor, with automatic damping if desired, after the application of driving impulses has been terminated.

We claim as our invention:

1. A closed-loop control system for a step motor comprising the combination of drive means for effecting stepping movement of the motor in response to successive pulses supplied to the drive means, starting means for supplying at least one pulse to the drive means for initiating stepping movement of said motor, a transducer responsive to a predetermined reference switching angle, feedback means for supplying said feedback pulses to said drive means to continue the stepping movement of said motor, adjustable switching angle control means connected to said feedback means for electronically adjusting the effective switching angle at which said feedback pulses are supplied to said drive means, and speed control means receiving the feedback pulses from said transducer and automatically adjusting said switching angle control means in response to the rate of generation of said feedback pulses.

2. A closed-loop control system as set forth in claim 1 wherein said adjustable switching angle control means comprise time delay means for varying the time relationship between said feedback pulses and the stepping movement of said motor so as to vary said effective switching angle.

3. A closed-loop control system as set forth in claim 2 wherein the time relationship between the feedback pulses produced by said transducer and the stepping movement of the motor produces a motor speed, in the absence of any time delay of the feedback pulses and with a maximum load on the motor, at least as great as the maximum desired motor speed.

4. A closed-loop control system as set forth in claim 1 wherein said speed control means includes means for generating a reference signal representing a desired speed for the stepping motor, a comparator for comparing the actual motor speed as represented by the rate of generation of said feedback pulses with the desired motor speed as represented by said reference signal, said comparator including means for generating an error signal representing any difference between said actual and desired speeds, and automatic adjusting means associated with said switching angle control means for adjusting said switching angle control means in response to said error signal.

5. A closed-loop control system as set forth in claim 4 wherein said switching angle control means comprises time delay means for varying the time relationship between said feedback pulses and the stepping movement of said motor so as to vary said effective switching angle, and said means for adjusting said switching angle control means adjusts said time delay means by a fixed unit of time in response to the error signal produced after each step of the motor.

6. A closed-loop control system as set forth in claim 4 wherein said adjusting means adjusts said switching angle control means proportionally with respect to said error signal.

7. A closed-loop control system as set forth in claim 4 wherein said switching angle control means comprises time delay means for varying the time relationship between said feedback pulses and the stepping movement of said motor so as to vary said effective switching angle, said error signal represents only the direction of any difference between said actual and desired speeds, and said means for adjusting said switching angle control means is responsive to said error signal for adjusting said time delay means by a fixed unit of time in the direction that will reduce the difference between said actual and desired speeds.

8. A closed-loop control system as set forth in claim 4 wherein said switching angle control means comprises time delay means for varying the time relationship between said feedback pulses and the stepping movement of said motor so as to vary said effective switching angle, said error signal represents both the magnitude and direction of any difference between said actual and desired speeds, and said means for adjusting said switching angle control means is responsive to said error signal for adjusting said time delay means in proportion to the magnitude represented by said error signal and in the direction that will return the actual speed toward the desired speed.

9. A closed-loop control system as set forth in claim 2 which includes means for manually adjusting said time delay means.

10. A closed-loop control system as set forth in claim 2 which includes start-up means responsive to a first actual motor speed below the desired steady state speed for adjusting said time delay means to introduce a first time delay into the feedback loop to reduce speed overshoot, and means responsive to an actual motor speed equal to the desired steady state speed for introducing a second time delay larger than said first time delay into the feedback loop to stabilize the actual motor speed at the desired steady state speed.

11. A closed-loop control system as set forth in claim 1 which includes means for terminating the supply of said feedback pulses to said drive means in response to a predetermined number of steps of said motor.

12. A closed-loop control system as set forth in claim 11 which includes means for supplying decelerating pulses to said drive means at selected time intervals following termination of the supply of said feedback pulses to said drive means.

13. A closed-loop control system as set forth in claim 11 which includes means for supplying damping pulses to said drive means at selected time intervals following termination of the supply of said feedback pulses to said drive means.

14. A method of controlling a step motor having a pulse responsive drive means, said method comprising the steps of initiating stepping movement of said motor by applying at least one initial start-up pulse to said drive means, generating feedback pulses in direct relationship to the rate of stepping movement of said motor, said feedback pulses being generated at a predetermined reference switching angle, applying said feedback pulses to said drive means to continue the stepping movement of said motor, and adjusting the effective switching angle at which said feedback pulses are applied to said drive means by adjusting the time relationship between said feedback pulses and the rate of stepping movement of said motor in response to the rate of generation of said feedback pulses to control the speed of said motor.

15. A method of controlling a step motor as set forth in claim 14 wherein said time relationship is adjusted by delaying said feedback pulses.

16. A method of controlling a step motor as set forth in claim 14 which includes the steps of generating a reference signal representing a desired speed for the stepping motor, comparing the actual motor speed as represented by the rate of generation of said feedback pulses with the desired motor speed as represented by said reference signal, generating an error signal representing any difference between said actual and desired speeds, and adjusting said time relationship in accordance with said error signal.

17. A method of controlling a step motor as set forth in claim 14 wherein the application of said feedback pulses to said drive means at said reference switching angle and with a maximum load on the motor produces a motor speed at least as great as the maximum desired motor speed.

18. A method of controlling a step motor as set forth in claim 16 wherein said error signal represents only the direction of any difference between said acutal and desired speeds, and said time relationship is adjusted in response to said error signal by a fixed unit of time in the direction that will reduce the difference between said actual and desired speeds.

19. A method of controlling a step motor as set forth in claim 16 wherein said error signal represents both the magnitude and direction of any difference between said actual and desired speeds, and said time relationship is adjusted in response to said error signal in proportion to the magnitude represented by said error signal and in the direction that will return the actual speed toward the desired speed.

20. A method of controlling a step motor as set forth in claim 14 in which the motor is started with said feedback pulses being applied to said drive means at said reference switching angle, and including the steps of adjusting said time relationship during starting acceleration of the motor to provide an effective switching angle less than that required for the desired steady state speed of the motor so as to reduce speed overshoot, and then adjusting said time relationship to the value required to stabilize the motor speed at the desired steady state speed.

21. A method of controlling a step motor as set forth in claim 14 which includes the step of terminating the application of said feedback pulses to said drive means in response to a predetermined number of steps of said motor.

22. A method of controlling a step motor as set forth in claim 21 which includes the step of applying decelerating pulses to said drive means at selected time intervals following termination of the application of said feedback pulses to said drive means.

23. A method of controlling a step motor as set forth in claim 21 which includes the step of applying damping pulses to said drive means at selected time intervals following termination of the application of said feedback pulses to said drive means.

* * * * *